United States Patent [19]

Brashear et al.

[11] Patent Number: 4,924,450
[45] Date of Patent: May 8, 1990

[54] ULTRASONIC RANGING AND DATA TELEMETRY SYSTEM

[75] Inventors: Hugh R. Brashear, Farragut; Michael S. Blair; James E. Phelps, both of Knoxville; Martin L. Bauer; Charles H. Nowlin, both of Oak Ridge, all of Tenn.

[73] Assignee: Martin Marietta Energy Systems, Inc., Oak Ridge, Tenn.

[21] Appl. No.: 338,529

[22] Filed: Apr. 13, 1989

Related U.S. Application Data

[63] Continuation of Ser. No. 28,986, Mar. 23, 1987, abandoned.

[51] Int. Cl.⁵ .............................................. G01S 3/80
[52] U.S. Cl. ................................ 367/118; 250/336.1; 324/329; 364/516
[58] Field of Search ............... 250/336.1; 324/329; 364/516; 367/118, 117, 127, 128, 129, 908, 902

[56] References Cited

U.S. PATENT DOCUMENTS

| | | | |
|---|---|---|---|
| 3,886,553 | 5/1975 | Bates | 367/127 |
| 4,254,478 | 3/1981 | Dumas | 367/902 |
| 4,516,226 | 5/1985 | Peynaud et al. | 367/127 |
| 4,561,064 | 12/1985 | Brüggen et al. | 367/902 |
| 4,719,407 | 1/1988 | Converse et al. | 324/546 |

Primary Examiner—Nelson Moskowitz
Assistant Examiner—David Cain
Attorney, Agent, or Firm—James M. Spicer; Bruce M. Winchell

[57] ABSTRACT

An ultrasonic ranging and data telemetry system determines a surveyor's position and automatically links it with other simultaneously taken survey data. An ultrasonic and radio frequency (rf) transmitter are carried by the surveyor in a backpack. The surveyor's position is determined by calculations that use the measured transmission times of an airborne ultrasonic pulse transmitted from the backpack to two or more prepositioned ultrasonic transceivers. Once a second, rf communications are used both to synchronize the ultrasonic pulse transmission-time measurements and to transmit other simultaneously taken survey data. The rf communications are interpreted by a portable receiver and microcomputer which are brought to the property site. A video display attached to the computer provides real-time visual monitoring of the survey progress and site coverage.

15 Claims, 4 Drawing Sheets

ULTRASONIC RANGING AND DATA TELEMETRY SYSTEM

This is a continuation of Ser. No. 028,986, filed Mar. 23, 1987, now abandoned.

BACKGROUND OF THE INVENTION

This invention relates to an ultrasonic ranging system, and in particular to a method and apparatus for an ultrasonic ranging and data telemetry system capable of taking and correlating ultrasonic pulse transmission-time measurements with simultaneously taken survey data.

Radiation surveys are currently performed using four to ten technicians and corresponding radiation detection equipment. The technicians conduct walk-on radiation surveys to locate and document deposits of anomalous radiation. Although these radiation surveys are done as accurately and timely as present technology will allow, there are inherent problems and possible inaccuracies in the current procedures. These problems include: (a) assuring complete coverage of the property surveyed and ensuing time taken to assure complete property coverage, (b) estimation and accuracy in plotting of anomalous deposits of radiation on maps, and (c) information transfer, conversion and transcription of all data taken in the field. The time consumed to assure accuracy in radiological surveys, as done currently, can be costly.

SUMMARY OF THE INVENTION

Accordingly, it is an object of the present invention to provide a method and apparatus for surveying a property site while simultaneously acquiring and storing data about the property site.

It is a further object of the present invention to provide a method and apparatus that will assure complete survey coverage of the property site in a single visit to the property site.

It is still a further object of the present invention to provide a method and apparatus for providing an inexpensive method of surveying that is simple and easy to set up.

Yet another object of the present invention is to provide a method and apparatus for achieving comprehensive survey coverage of a property site with respect to pollutant deposits such as radiation at the property site.

Still another object of the present invention is to provide a method and apparatus for operating a position locator and tracking system.

Other objects and advantages of this invention will become more apparent hereinafter in the specification and the drawings.

According to the present invention, a method of surveying a property site is provided comprising the steps of positioning a plurality of transceivers on or in the vicinity of the property site wherein line of sight communication is maintained from all points on the property site to at least two of said transceivers determining a relative location of a mobile survey means placed in line of sight communication with at least two transceivers, wherein the relative location is based upon the distance between the mobile survey means and each of the at least two transceivers in line of sight communication with the mobile survey means; transmitting the relative location of the mobile survey means based upon signals transmitted from the at least two transceivers in line of sight communication therewith; correlating the transmitted relative location of the mobile survey means with a digital database representation of the property site being surveyed thereby positively locating the mobile survey means with respect to the property site; traversing the property site with the mobile survey means; and recording the relative location of the mobile survey means with respect to the digital database representation as the mobile survey means traverses the property site.

In another aspect of the present invention, an apparatus for surveying a property site comprises a plurality of transceivers positioned on or in the vicinity of the property site wherein line of sight communication is maintained from all points on the property site to at least two of the transceivers; a mobile survey means located within line of sight communication of the at least two transceivers for transmitting ultrasonic pulses to the at least two transceivers; means for measuring the travel time for the ultrasonic pulses to travel from the mobile survey means to each of the at least two transceivers; means for determining a relative location of the mobile survey means with respect to the at least two transceivers from the measured travel times; means for correlating the relative location with a digital database representation of the property site being surveyed; and means for recording the relative location of the mobile survey means with respect to the digital database representation as the mobile survey means traverses the property site.

The present invention uses a ranging and data transmission system which determines a surveyor's position with high accuracy and automatically links it with other simultaneously taken survey data. An ultrasonic transmitter and a radio frequency (rf) transmitter are carried by the surveyor in a backpack. The surveyor's position is determined by calculations that use the measured transmission times of an airborne ultrasonic pulse transmitted from the surveyor's backpack to two or more prepositioned ultrasonic receivers. At predetermined time intervals, rf communications are used both to synchronize the ultrasonic pulse transmission-time measurements and to transmit other simultaneously taken survey data. The rf communications are interpreted by a portable receiver and microcomputer which are brought to the property site. A video display attached to the microcomputer provides real-time visual monitoring of the survey coverage. Additionally, a hard copy of a survey report may be generated by a printer connected to the microcomputer.

DETAILED DESCRIPTION OF THE PREFERRED EMBODIMENTS

Figure 1:
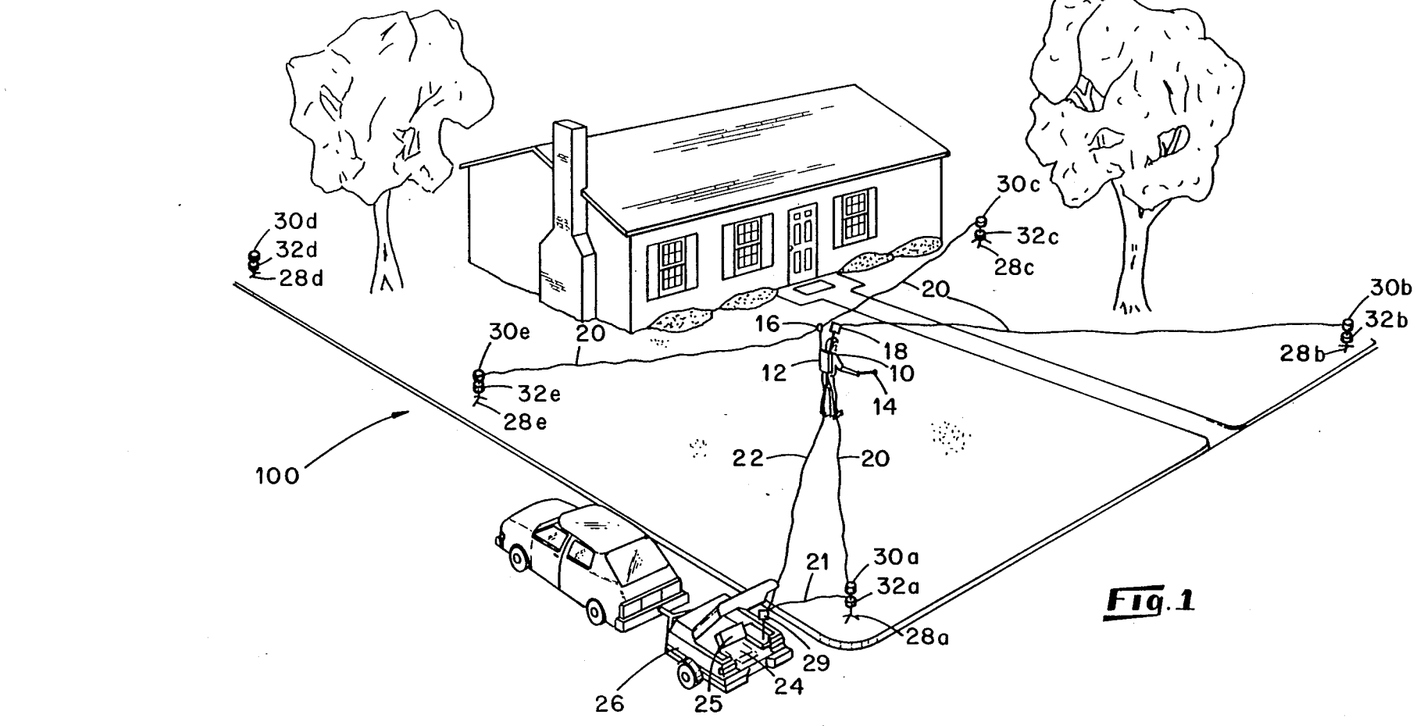
FIG. 1 is a rendering of a property site being surveyed by the ultrasonic ranging and data telemetry system according to the present invention.

Referring now more particularly to FIG. 1, a surveyor 10 wearing a backpack 12 and carrying a sensor 14 moves back and forth across a property site designated generally by reference numeral 100. For purposes of illustration only, it will be assumed that sensor 14 is a radiation sensor, although sensor 14 may be any type of sensor or instrument used to extract data from the property site, such as a metal or gas detector. Inside backpack 12 are a data signal transmission means, an ultrasonic transmitter and a microprocessor (none of which are shown in FIG. 1) which will be used in combination with the radiation sensor 14. For purposes of illustration only, it will be assumed that the data signal transmission means is a radio frequency (rf) transmitter, although the data signal transmission means may be any type of data signal transmission means such as a coaxial cable or optical transmission system.

Two antennas 16 and 18 extend from the backpack 12, one, 16, for the ultrasonic transmitter and the other, 18, for the rf transmitter, both of which are carried inside the backpack 12. At predetermined time intervals, these ultrasonic and rf transmitters simultaneously transmit ultrasonic and radio signals 20 and 22, respectively. The predetermined time interval should be long enough to allow the ultrasonic signals 20 to clear the area being surveyed. For example, if the property site is approximately 1000 feet across at its longest diagonal, the predetermined time interval should be about one second where the speed of sound is approximately 1100 ft/sec. The time interval may also be longer as desired.

The rf signal 22 carries radiation information detected by sensor 14 and is sent to a computer 24 via a receiver 29. The ultrasonic signal 20 is sent to a plurality of ultrasonic transceivers 30a,b,c . . . mounted on perimeter stations 28a,b,c . . . set up around the property site 100. Desirably, the perimeter stations are set up at the boundaries of the property to be surveyed, but it should be understood that the stations may be positioned on or in the vicinity of the property, so long as their positions with respect to the property are known. Computer 24 may be a personal computer such as an IBM PC, housed in an equipment trailer 26 parked at the property site, which can communicate with the backpack 12 via rf signal 22 and receive signals from perimeter stations 28a,b,c . . . via receiver 29. Alternatively, computer 24 might be part of the apparatus carried by the surveyor.

The ultrasonic transceivers 30a,b,c . . . mounted on the perimeter stations 28a,b,c . . . on the property site boundary listen for the ultrasonic signal 20. As each transceiver 30a,b,c . . . hears the ultrasonic signal 20, the respective arrivals of the ultrasonic signal 20 at the transceivers 30a,b,c . . . are announced to the computer 24 via receiver 29 using an rf signal 21 generated by rf transceivers 32a,b,c . . . . For purposes of description, signal 21 is shown only between perimeter station 28a and receiver 29. However, it is to be understood that a signal 21 is similarly transmitted from the other perimeter stations within listening range of the ultrasonic signal 20. Furthermore, it is to be understood that rf transceivers 32a,b,c . . . may be suitably replaced by any other data signal generation means, such as an electronic pulser, and that signal 21 may be carried by any suitable transmission means, such as a coaxial cable or optical transmission system.

The time it takes for the ultrasonic signal 20 to travel one-way from the backpack 12 to the respective transceivers 30a,b,c . . . is multiplied by the speed of sound to obtain a measure of the distance between the backpack 12 and that respective transceiver 30a,b,c . . . These distance measurements are used to then locate the surveyor's position on the property site as will be described hereinafter. Alternatively, these distance measurements might be obtained by measuring the two-way travel time that it takes for the ultrasonic signal 20 to travel to the respective transceivers 30a,b,c . . . and back to the backpack 12 via a return echo (not shown).

Perimeter stations 28a,b,c . . . are placed around the property to ensure that the surveyor 10 will always be in line of sight communication with at least two but preferably three perimeter stations from anywhere on the property site. Preferably, the transceivers are so located that the surveyor is always within line of sight of three or more transceivers. In this disclosure, the phrase "line of sight communication" is defined to mean reasonably direct acoustic line of detection. This is equivalent to optical line of sight except that sound will diffract around the corners of obstructions to some degree. For this reason, objects that are optically hidden from each other by an obstruction may be acoustically visible. However, the length of the acoustic path or line of detection in such cases will be greater than the length of the straight line path. The difference in path lengths is a cause of error in determining the location of the mobile survey means. To limit this error, a reasonably direct acoustic line of detection is one where this difference is less than 2 feet.

After the locations of all perimeter stations 28a,b,c . . . are recorded and correlated to a digital database representation of the property site stored in the computer 24, the surveyor 10 begins to gather data on the property site 100 by walking back and forth in a "lawn-mowing" pattern. As the surveyor 10 sweeps the sensor 14 over the surface of the property site, sensor 14 measures radiation emanating from the surface. The information is accumulated for a predetermined time interval, then encoded on the rf signal 22 and sent directly from backpack 12 to the computer 24. Computer 24 automatically correlates the radiation data with the surveyor's location. Objects such as buildings or trees do not interfere with the survey because a sufficient number of perimeter stations are deployed so that the ultrasonic transmitter in the backpack 12 is always within range of at least two and preferably three perimeter stations 28.

Figure 2:
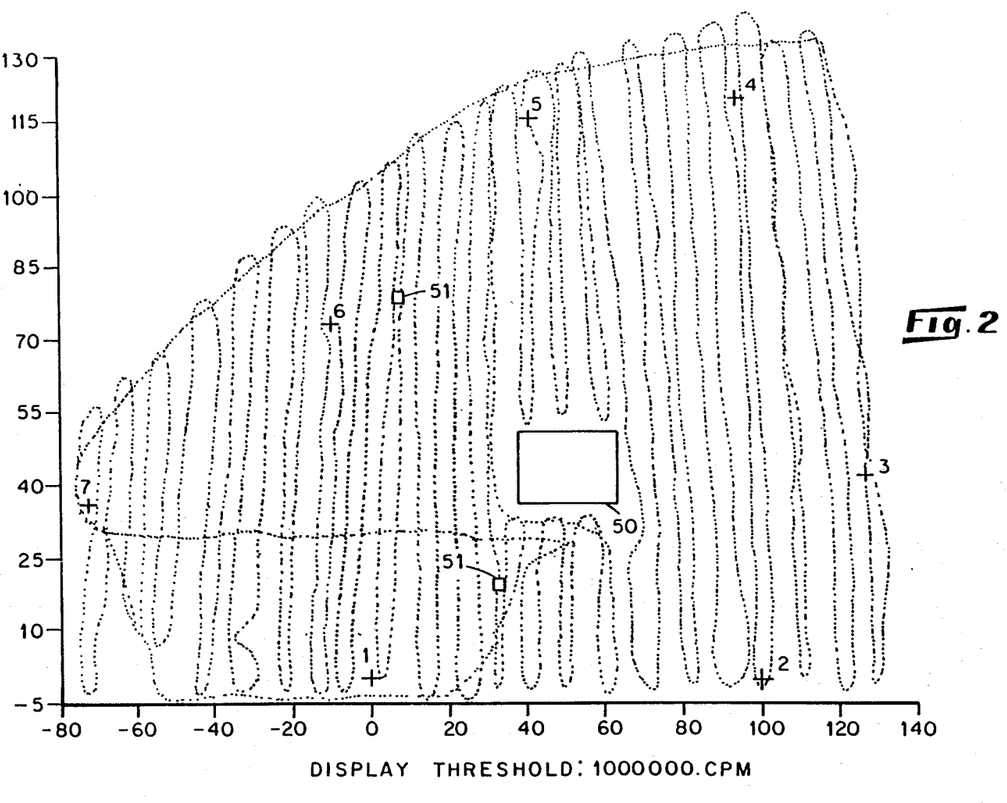
FIG. 2 is a representative plot of survey site coverage as seen by a technician viewing the computer screen for a determination of adequate site coverage.

During the survey, the radiation measurements and surveyor's location are stored in the computer 24. At the same time, the surveyor's position is plotted on the database representation of the property site using a video display 25 of the computer 24. Thus, with just a quick glance at the display 25, the surveyor 10 can verify the completeness of the survey coverage and return to any area missed without losing time. A representative plot of what might be viewed on the display 25 is shown in FIG. 2. Squares 50 and 51 indicate obstructions on the property site, such as buildings. The numbered crosses indicate locations of the perimeter stations. As can be seen, one can easily determine if the property site has been adequately covered by following the trace of the dots.

Figure 3:
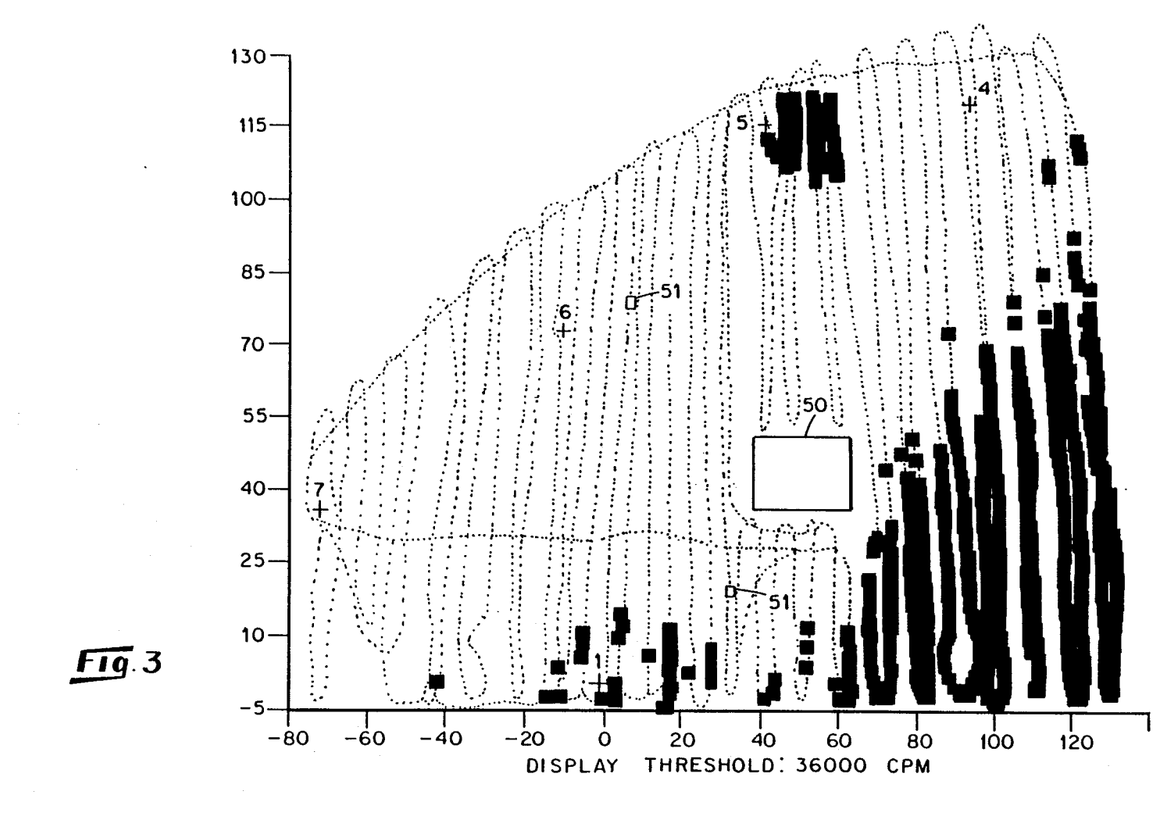
FIG. 3 is a representative plot of a property site showing the locations at the site where sensor readings exceeded a chosen threshold level.

The computer 24 is programmed to analyze data at the survey site after the survey is complete. The surveyor may choose an appropriate threshold level and the computer 24 will then display a map showing all locations with readings at or above the level chosen, as shown by the representative plot depicted in FIG. 3. For example, in FIG. 3, the dots indicate the surveyor's position when the measured radiation level was less than 36,000 counts per minute but the square blips indicate his position when the measured radiation level was greater than 36,000 counts per minute. The computer 24 may also be used to print out diagrams and charts of the survey results, which might include such information as isoexposure contours or three dimensional representations of the data. Data tables for the final report may be printed out immediately so that the surveyor may review them before leaving the site, thereby assuring accurate data acquisition on only one visit to the property site.

A key feature of the above described procedure is the ability to correctly locate the surveyor 10 holding the sensor 14 in relation to the property site being surveyed. This is accomplished during the boot-up or set-up phase of the survey operation which will now be described in further detail. Again referring to FIG. 1, the boot-up process is begun by arbitrarily positioning a first ultrasonic transceiver 30a and a first rf transceiver 32a located on top of a first perimeter station 28a on or in the vicinity of the property site. A second ultrasonic transceiver 30b and a second rf transceiver 32b located atop a second perimeter station 28b is positioned at some distance from the first perimeter station 28a. This distance is then carefully measured and entered into the computer. Alternatively, the first and second perimeter stations 28a and 28b may be linked together by a chain of a known length.

Next, the computer and the first transceiver 30a are turned on. The computer assumes that this first transceiver is located at a location x=0 and y=0. The second transceiver 30b is then turned on and is assumed by the computer to reside at the coordinates x=D, y=0 where D is the distance between the first transceiver 30a and the second transceiver 30b. The backpack 12 is then placed at some point on the line between stations 28a and 28b and its ultrasonic transmitter is turned on. When rf transceivers 32a and 32b receive an ultrasonic pulse from the ultrasonic transmitter located in backpack 12, rf signals are sent to the computer to indicate the travel time of the ultrasonic pulse from the backpack 12 to the respective transceivers 30a and 30b. The computer adds these two travel times together, divides the distance D by the sum of the two travel times and stores the result as the speed of sound for the current atmospheric conditions. This process may be bypassed if the speed of sound for the current atmospheric conditions is already known.

Next, a third ultrasonic transceiver 30c and a third rf transceiver 32c mounted on top of a third perimeter station 28c is placed within line of sight communication of the first and second perimeter stations 28a and 28b. While several techniques may be used to identify the position of the third perimeter station 28c with respect to the other two perimeter stations, the simplest technique with the equipment available at the property site will be described.

Once the third perimeter station 28c has been positioned, the backpack with its ultrasonic transmitter is placed on top of the third perimeter station 28c. The location of this third perimeter station 28c is determined using data from the first and second perimeter stations 28a and 28b in conjunction with the ultrasonic signal transmitted from the backpack. The computer applies a simple geometric algorithm, shown graphically in FIG. 4, for determining two possible points of intersection of two circles 40 and 41 having radii R1 and R2 and their centers at the first and second perimeter stations 28a and 28b, respectively. Radii R1 and R2 correspond to the distances between the respective perimeter stations 28a and 28b and the backpack 12 where backpack 12 also corresponds to the position of the third station 28c. Radii R1 and R2 are calculated by multiplying the time of flight measurements between the backpack 12 and the perimeter stations 28a and 28b by the speed of sound. The algorithm returns two possible locations for the third perimeter station 28c, one having a positive y-coordinate at the location of the third perimeter station 28c and the other having a negative y-coordinate. The ambiguity is resolved by having the computer assume that the third perimeter station 28c will always have a positive y-coordinate where first perimeter station 28a is at x=0, y=0 and second perimeter station 28b is at x=D, y=0.

Figure 4:
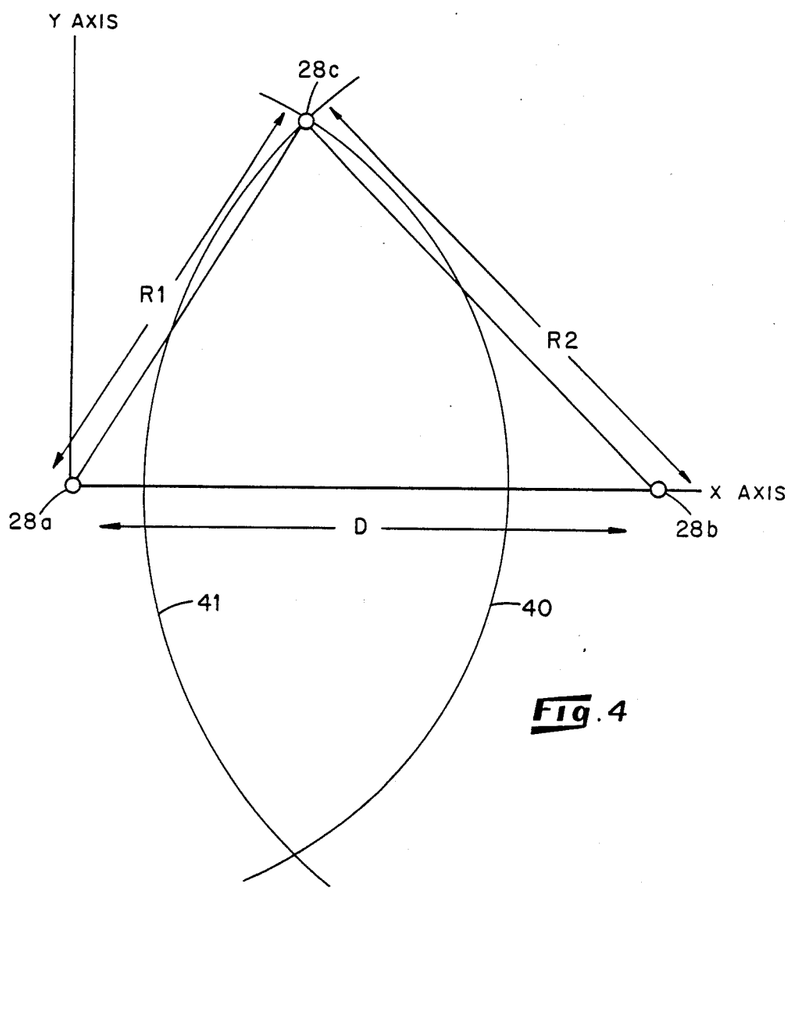
FIG. 4 is a graphical representation of the geometric algorithm applied to determine the relative location of a third perimeter station.

This same simple geometric algorithm is used to locate the surveyor during the course of the survey when only two ultrasonic transceivers are within line of sight of the surveyor. Again, note that the preferred practice is to have transceivers so positioned that the surveyor is always within line of sight communication of at least three of them. When only two transceivers are within line of sight communication with the surveyor, a position ambiguity is created that must be resolved by invoking other information or assumptions not based on ultrasonic distance measurements. For instance, if the area to be surveyed is described by a map that has been entered into the computer, then the ambiguity may be resolved by testing the possible locations of the surveyor and finding that only one is within the area to be surveyed. If this test does not resolve the ambiguity, then it may be resolved by comparing the surveyor's calculated velocity during the previous time interval for both possible locations and selecting the one that implies the most reasonable velocity. For instance, if one ambiguous location would require the surveyor to have traveled at 15 meters per second and the other at 2 meters per second, then the latter location would be chosen as correct. It should be noted that it is not certain that the ambiguity can be resolved when ultrasonic distance measurements are available from only two transceivers. It might be that both ambiguous locations would require the surveyor to have traveled at 1 meter per second. Further, it should be noted that the longer the surveyor is within line of sight of only two transceivers, the greater the chance of mislocating him. Accordingly, for purposes of further discussion, it will be assumed that a third transceiver is provided in line of sight communication with the surveyor. After three perimeter stations have been located, the next step is to locate the backpack 12 with respect to the three perimeter stations. This process, called triangulation, will now be described.

The method of triangulation used to describe the location of the backpack with respect to the three perimeter stations may be understood by imagining the three perimeter stations 28a,b and c located roughly at the three corners of an equilateral triangle. Such regular positioning of the perimeter stations is by no means necessary, but is used merely to facilitate the description. For example, assume that the sides of the triangle are 100 feet long and that the surveyor is located about 75 feet from one perimeter station, about 50 from a second perimeter station and as a result of all these assumptions, 52.66 feet from the third perimeter station. An imaginary vertical line is located at the position of each perimeter station having a height equal to the measured distance between the surveyor and the particular perimeter station. Thus, the first vertical line at the first perimeter station will be 75 feet tall, that at the second perimeter station will be 50 feet tall and that at the third perimeter station will be 52.66 feet tall. In order to determine the location of the surveyor from the heights of the vertical line's, a huge 45# cone having its axis vertically oriented with its tip pointed downward is dropped in between the three vertical lines. The point where the tip of the cone would come to rest on the ground is the location of the surveyor. Ideally, the tops of the vertical lines would fit perfectly against the surface of the cone. Furthermore, if more perimeter stations and more vertical lines were added, they would also just touch the surface of the cone.

Mathematically, if the tip of the cone or position of the surveyor is located at ($X_{tip}$, $Y_{tip}$), the vertical distance $H_k$ of any point on the surface of the cone from the ground over the k-th perimeter station located at ($X_k$, $Y_k$) is $$H_k = \sqrt{(X_k - X_{tip})^2 + (Y_k - Y_{tip})^2} \quad (1)$$

Then, if the ultrasonically measured distance between the surveyor and the k-th perimeter station is $P_k$, then the height of the vertical line at the k-th perimeter station is $P_k$. The ultrasonically measured height $P_k$ is subtracted from the calculated height $H_k$ and squared. This is repeated for each k-th perimeter station and summed to form a total T and may be represented by the equation $T = \Sigma T_k$ where $$T_k = (H_k - P_k)^2 \quad (2)$$

For perfect data, the total T is zero as well as a minimum when ($X_{tip}$, $Y_{tip}$) is the same as the location of the surveyor.

However, because of ultrasonic measurement errors and variations in the height of the terrain being surveyed, some of the vertical lines will be too long and some of the vertical lines will be too short. Thus, if the cone's axis is constrained to be vertical as it is dropped between the vertical lines, some of the vertical lines will fall short of the surface of the cone while others will be forced through the surface of the cone. In this situation, in order for the tip of the cone to touch the ground the long vertical lines must "punch through" the vertical cone, while the short vertical lines will cause a "fall short" error. Thus, when these ultrasonic measurement errors exist, the total T is a minimum not equal to zero, and ($X_{tip}$, $Y_{tip}$) is the location of the surveyor.

The aforementioned algorithm can be fine-tuned in a variety of ways. One of these ways is by using different weights for the punch through errors than for the fall short errors. In particular, punch through errors may be more likely than fall short errors. If so, they may be given less weight in computing T. Experimentally it was found that the hardware produced data that rarely indicated that the ultrasonic distance was less than the true distance but more frequently indicated that the ultrasonic distance was greater than the true distance.

In order to stabilize the calculation against the punch through errors caused by acoustic diffraction, the following weight factors were applied. If the vertical line at the k-th perimeter station was less than 0.5 feet too long, then the contribution to T from the k-th perimeter station was computed by squaring the excess length as indicated by equation (2). If the vertical line was between 0.5 feet and 2.5 feet too long, then the contribution was computed by multiplying the excess length by 0.1 and adding 0.2. If the vertical line was more than 2.5 feet too long, then the contribution was computed by multiplying the excess length by 0.02 and adding 0.04.

Many methods may be used to determine the coordinate ($X_{tip}$, $Y_{tip}$) that reduces T to a minimum. One suitable method of reducing equation (2) to a minimum is a search technique employing a standard method known as the SIMPLEX algorithm as described by M. J. Box, D. Davies and W. H. Swann in *Non-Linear Optimization Techniques*, Oliver and Boyd, Great Britain, 1969, and is incorporated herein by reference. The distances $P_k$ and location of the k-th perimeter stations ($X_k$, $Y_k$) may be easily determined using the time of flight measurement of the ultrasonic pulse transmitted from the backpack 12 to the individual perimeter stations. However, it is to be further understood that these distances $P_k$ and locations ($X_k$, $Y_k$), while critical to the triangulation algorithm, may be measured in any suitable manner.

Once the position of the backpack has been located using a minimization algorithm incorporating the aforementioned triangulation algorithm, the position of the backpack is correlated with a digital database representation of the property site. Such a digital representation can be developed with commercially available computer aided design software, such as Autocad by Autodesk, Inc. The surveyor merely walks with the backpack to a reference point on the property site (e.g., a survey marker or corner of a house) that is also contained within the digital database representation. A surveyor's position is displayed on the computer display along with an overlay of the digital database representation. Thus, as long as the surveyor can establish two points of reference or the property site that are also in the digital database representation, the computer can translate the digital database representation to correlate with the surveyor's position on the property site. At this point, the computer has fixed the position of the surveyor carrying the backpack on the property site and the surveyor may place the remainder of the perimeter stations and begin his survey of the site, as described earlier.

The method and apparatus of the present invention has many potential applications in addition to radiological surveys. For example, the present invention would find great utility as a position locator or tracking system aside from its benefits in the area of surveying. Furthermore, by changing the sensor, the system could measure any pollutant or other hazard for which a portable sensor exists. For example, it could map pollutants, spills or other accidents. Combined with robotics, it could survey areas too hazardous for humans. It could also be used to record geological and biological features and track moving objects within a predefined area. This system tracks position and rapidly produces high quality data and eliminates the need for manual data entry, thereby greatly reducing human error and report preparation time.

Thus, although the invention has been described relative to the specific embodiments thereof, it is not so limited, and numerous variations and modifications thereof will be readily apparent to those skilled in the art in light of the above teaching. It is therefore to be understood that within the scope of the appended claims the invention may be practiced otherwise than as specifically described.

What is claimed is:

1. A method for surveying a property site comprising the steps of:
   (a) positioning a plurality of portable transceivers on or in the vicinity of the property site wherein acoustic line of sight is maintained to at least two of the transceivers from all points of the site;
   (b) positioning a survey means on the property site within acoustic line of sight of at least two transceivers;
   (c) transmitting an ultrasonic pulse from the survey means;
   (d) receiving the ultrasonic pulse at each of the at least two transceivers;
   (e) determining time differences which are elapsed times between transmitting the ultrasonic pulse from the survey means and receiving the ultrasonic pulse at each of the at least two transceivers;
   (f) determining a relative location of the survey means based on the time difference between transmitting the ultrasonic pulse from the survey means and receiving the ultrasonic pulse at each of the at least two transceivers and the speed of sound;
   (g) recording the relative location of the survey means;
   (h) moving the survey means to a different location on the site; and
   (i) repeating steps (b) through (h) until the survey of the site is complete.

2. The method for surveying according to claim 1 wherein step (a) further comprises the steps of:
   positioning a first two portable transceivers on or in the vicinity of the property site; and
   positioning additional portable transceivers on or in the vicinity of the property site as needed to maintain an acoustic line of sight to at least two transceivers from all points of the property site wherein the additional transceivers are positioned on a same side of a base line joining and extending beyond the first two transceivers.

3. The method for surveying according to claim 2 wherein step (b) further comprises positioning the survey means to the same side as the additional transceivers with respect to the base line joining and extending beyond the first two transceivers.

4. The method for surveying according to claim 3 further comprising a step after step (f) of determining an unambiguous location of the survey means that is based on the relative location of the survey means and on the positioning of the survey means on the same side as the additional transceivers with respect to the base line joining and extending beyond the first two transceivers.

5. The method for surveying according to claim wherein step (e) further comprises:
   starting a timing means in response to transmitting the ultrasonic pulse from the survey means;
   stopping the timing means in response to receiving the ultrasonic pulse at each of the at least two transceivers; and
   generating time difference signals which represent the elapsed time between transmitting the ultrasonic pulse at the survey means and receiving the ultrasonic pulse at each of the at least two transceivers.

6. The method for surveying according to claim 1 further comprising the steps of:
   sensing information about the site with the survey means;
   generating an information signal which represents the information about the site;
   transmitting the information signal simultaneously with the ultrasonic pulse from the survey means;
   receiving the information signal from the survey means;
   determining the information about the site based on the information signal; and
   recording the information about the site with the relative position of the survey means.

7. A method as claimed in claim 1, further including the step of determining the speed of sound at the property site.

8. A method as claimed in claim 7, wherein the step of determining the speed of sound comprises the steps of:
   positioning a first transceiver at a first location;
   positioning a second transceiver at a second location a distance from said first transceiver and in line of sight communication with the first transceiver;
   positioning the survey means along the line of sight communication between the first and second transceivers;
   transmitting an ultrasonic pulse from the survey means to each of the first and second transceivers;
   measuring travel time for the ultrasonic pulse to reach the first and second transceivers, respectively;
   adding the travel times measured to obtain a total travel time; and
   dividing the distance between the first and second transceivers by the total travel time to determine the speed of sound at the property site.

9. A method for surveying a property site comprising the steps of:
   (a) positioning a plurality of portable transceivers on or in the vicinity of the property site wherein acoustic line of sight is maintained to at least two of the transceivers from all points of the site;
   (b) positioning a survey means on the property site within acoustic line of sight of at least two transceivers;
   (c) transmitting an ultrasonic pulse from the survey means;
   (d) receiving the ultrasonic pulse at each of the at least two receivers;
   (e) determining a time difference between transmitting the ultrasonic pulse from the survey means and receiving the ultrasonic pulse at each of the at least two transceivers;
   (f) determining a relative location of the survey means based on the time difference between transmitting the ultrasonic pulse from the survey means and receiving the ultrasonic pulse at each of the at least two transceivers and the speed of sound comprising the further steps:
      (i) determining a distance $P_k$ ($k=1,2,3\ldots$) between the survey means and each of the at least two transceivers;

(ii) approximating a location ($X_{tip}$, $Y_{tip}$) of the survey means;

(iii) calculating a distance $H_k$ (k=1,2,3 . . . ) between the approximated location ($X_{tip}$, $Y_{tip}$) and each of the at least two transceivers located at ($X_k$, $Y_k$) according to the equation $$H_k = \sqrt{(X_k - X_{tip})^2 + (Y_k - Y_{tip})^2} \ ;$$

(iv) calculating a total T based upon the measured distance $P_k$ and the calculated distance $H_k$ according to the equation $$T = \Sigma(H_k - P_k)^2$$

wherein k=1,2,3 . . . ; and (v) repeating steps (ii) through (iv) until total T is at a minimum, thereby indicating that ($X_{tip}$, $Y_{tip}$) is the location of the survey means;

(g) recording the relative location of the survey means;

(h) moving the survey means to a different location on the site; and (i) repeating steps (b) through (h) until survey of the site is complete.

10. A method as claimed in claim 9, wherein said step of determining as recited in step (i) includes the steps of:

transmitting an ultrasonic pulse from the survey means to each of the at least two transceivers;

measuring travel time for the ultrasonic pulse to reach each of the at least two transceivers; and multiplying each of the measured travel times by the speed of sound.

11. A method for surveying a property site, comprising the steps of:

(a) positioning a first two portable transceivers on or in the vicinity of the property site;

(b) positioning additional portable transceivers on or in the vicinity of the property site as needed to maintain an acoustic line of sight to at least two transceivers from all points of the property site wherein the additional transceivers are positioned on a same side of a base line joining and extending beyond the first two transceivers;

(c) determining the positions of the transceivers with respect to the property site and with respect to each other;

(d) recording the positions of the transceivers in a recording means;

(e) positioning a survey means on the property site within acoustic line of sight of at least two transceivers and to the same side as the additional transceivers with respect to the base line joining and extending beyond the first two transceivers;

(f) sensing information about the property site with the survey means;

(g) generating an information signal which represents the information about the property site;

(h) transmitting an ultrasonic pulse, a radio frequency pulse and the information signal simultaneously from the survey means;

(i) receiving the radio frequency pulse substantially simultaneously at the at least two transceivers;

(j) simultaneously starting first and second timing means in response to receiving the radio frequency pulse at each of the at least two transceivers;

(k) receiving the ultrasonic pulse at each of the at least two transceivers;

(l) stopping first the timing means in response to receiving the ultrasonic pulse at one of the at least two transceivers and stopping the second timing means in response to receiving the ultrasonic pulse at the other of the at least two transceivers;

(m) generating time difference signals which represent the elapsed times between receiving the radio frequency pulse and receiving the ultrasonic pulse at each of the at least two transceivers;

(n) transmitting the time difference signals to a correlating means;

(o) determining the distance of the survey means from each of the at least two transceivers by using the time difference signals and the speed of sound;

(p) determining the relative location of the survey means on the property site based on the distance of the survey means from each of the at least two transceivers;

(q) determining an unambiguous location of the survey means that is based on the relative location on the survey means and on the positioning of the survey means on the same side as the additional transceivers with the respect to the base line joining and extending beyond the first two transceivers;

(r) receiving the information signal from the survey means;

(s) determining the information about the property site based on the information signal;

(t) recording the unambiguous location of the survey means and the information about the property site in a recording means;

(u) displaying the unambiguous location of the survey means, the information about the property site and the position of the transceivers on a display means;

(v) moving the survey means to a different location on the property site;

(w) repeating steps (e) through (v) until the survey of the property site is complete; and (x) making a map of the property site based upon each of the absolute location marks and each of the information marks on the display means, whereby the map shows the information about the property site and the location where the survey means sensed the information.

12. An apparatus for surveying a property site comprising:

a plurality of portable transceivers positioned or on in the vicinity of the property site wherein acoustic line of sight is maintained to at least two of said transceivers from all points on the site;

a survey means positioned on the property site within acoustic line of sight of at least two of said transceivers and for transmitting an ultrasonic pulse;

means for determining a time difference between the time the survey means transmits the ultrasonic pulse and the time each of the at least two transceivers receives the ultrasonic pulse and for generating a time difference signal from each of the at least two transceivers;

a correlating means for receiving the time difference signals and for determining a relative location of the survey means based on the time differences and the speed of sound;

a recording means for recording the relative location of the survey means; and means for moving the survey means to a different position on the site.

13. The apparatus of claim 12 wherein said transceivers further comprise:
   a timer for measuring the time difference between the time when said survey means transmits the ultrasonic pulse and the time when said transceiver receives the ultrasonic pulse;
   a starting means for starting said timer in response to said survey means transmitting the ultrasonic pulse;
   a stopping means for stopping said timer in response to said transceiver receiving the ultrasonic pulse: and
   a time difference generating means for generating a time difference signal which represents the time difference measured by said timer.

14. The apparatus of claim 12 further comprising means for sensing characteristics of the property site as said survey means moves across the property site.

15. The apparatus of claim 14 wherein said means for recording simultaneously records the relative location and the characteristics of the property site.

* * * * *

UNITED STATES PATENT AND TRADEMARK OFFICE
CERTIFICATE OF CORRECTION

PATENT NO. : 4,924,450

DATED : May 8, 1990

INVENTOR(S) : H. R. Brashear et al

It is certified that error appears in the above-identified patent and that said Letters Patent is hereby corrected as shown below:

Column 9, line 62, after "claim" insert --1--.

Signed and Sealed this

Twelfth Day of September, 1995

Attest:

BRUCE LEHMAN

*Attesting Officer*   *Commissioner of Patents and Trademarks*